United States Patent
Doyen et al.

(10) Patent No.: US 12,008,776 B2
(45) Date of Patent: Jun. 11, 2024

(54) DEPTH MAP PROCESSING

(71) Applicant: InterDigital VC Holdings, Inc., Wilmington, DE (US)

(72) Inventors: Didier Doyen, La Bouexière (FR); Benoit Vandame, Betton (FR); Guillaume Boisson, Pleumeleuc (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 233 days.

(21) Appl. No.: 17/436,698

(22) PCT Filed: Feb. 13, 2020

(86) PCT No.: PCT/US2020/018175
§ 371 (c)(1),
(2) Date: Sep. 7, 2021

(87) PCT Pub. No.: WO2020/185351
PCT Pub. Date: Sep. 17, 2020

(65) Prior Publication Data
US 2022/0156955 A1    May 19, 2022

(30) Foreign Application Priority Data
Mar. 8, 2019   (EP) .................................. 19305273

(51) Int. Cl.
*G06T 7/50*   (2017.01)
*G06T 7/40*   (2017.01)

(52) U.S. Cl.
CPC .................. *G06T 7/50* (2017.01); *G06T 7/40* (2013.01); *G06T 2207/10016* (2013.01)

(58) Field of Classification Search
CPC ... G06T 2207/10016; G06T 7/40; G06T 7/50; H04N 13/122; H04N 13/128;
(Continued)

(56) References Cited

U.S. PATENT DOCUMENTS 8,773,427 B2   7/2014  Bae et al.
9,973,694 B1 *  5/2018  van Hoff .............. H04N 13/271
(Continued)

FOREIGN PATENT DOCUMENTS

CN    102572465 A    7/2012
CN    107509067 A    12/2017
(Continued)

OTHER PUBLICATIONS

Ji Hun Jang et al., "Encoder-friendly Global-view-depth for Free Viewpoint Video," 2018 IEEE Int'l Symposium on Circuits and Systems (ISCAS).
(Continued)

*Primary Examiner* — Ming Wu
(74) *Attorney, Agent, or Firm* — CONDO ROCCIA KOPTIW LLP

(57) ABSTRACT

For multi-view video content represented in the MVD (Multi-view+Depth) format, the depth maps may be processed to improve the coherency therebetween. In one implementation, to process a target view based on an input view, pixels of the input view are first projected into the world coordinate system, then into the target view to form a projected view. The texture of the projected view and the texture of the target view are compared. If the difference at a pixel is small, then the depth of the target view at that pixel is adjusted, for example, replaced by the corresponding depth of the projected view. When the multi-view video content is encoded and decoded in a system, depth map processing may be applied in the pre-processing and post-processing modules to improve video compression efficiency and the rendering quality.

27 Claims, 4 Drawing Sheets

(58) Field of Classification Search
CPC .. H04N 13/194; H04N 13/271; H04N 19/597; H04N 19/85; H04N 2213/003
See application file for complete search history.

(56) References Cited

U.S. PATENT DOCUMENTS

| | | | |
|---|---|---|---|
| 10,311,633 B2* | 6/2019 | Roimela | G06F 3/04815 |
| 2012/0242794 A1* | 9/2012 | Park | H04N 13/211 348/46 |
| 2013/0229485 A1* | 9/2013 | Rusanovskyy | H04N 13/161 348/43 |
| 2016/0335796 A1 | 11/2016 | Roimela | |
| 2016/0353129 A1 | 12/2016 | Jia et al. | |
| 2017/0287166 A1* | 10/2017 | Claveau | G06T 7/80 |

FOREIGN PATENT DOCUMENTS

| | | |
|---|---|---|
| EP | 2509324 A1 | 10/2012 |
| WO | 2013/030452 A1 | 3/2013 |
| WO | 2013/159330 A1 | 10/2013 |
| WO | 2014/011103 A1 | 1/2014 |

OTHER PUBLICATIONS

Tian, Hu, et al., "Accurate multi-view stereo by selective expansion," 2017 3DTV Conference: The True Vision—Capture, Transmission and Display of 3D Video (3DTV-CON).

Vetro et al., "Depth based 3D Video formats and coding technology", Apr. 1, 2013 (Apr. 1, 2013), XP055619437, Retrieved from the Internet:URL:https://www.merl.com/publications/docs/TR2013-138.pdf[retrieved on Sep. 6, 2019]* Section 8.4,p. 8  p. 13; figure 8.8  Section 8.4.2;p. 13 ** Section 8.4.4;p. 15 *.

Yusuke, U. et al.; "Free viewpoint video generation system using visual hull," 2018 Int'l Workshop on Advanced Image Technology (IWAIT).

* cited by examiner

DEPTH MAP PROCESSING

CROSS REFERENCE TO RELATED APPLICATIONS

This application is the national stage entry under 35 U.S.C. § 371 of International Application PCT/US2020/018175, filed Feb. 13, 2020 which was published in accordance with PCT Article 21(2) on Sep. 17, 2020, in English, and which claims the benefit of European Patent Application No. 19305273.5, filed Mar. 8, 2019.

TECHNICAL FIELD

The present embodiments generally relate to a method and an apparatus for depth map processing, and more particularly, to a method and an apparatus for processing depth maps associated with multi-view video content represented in the MVD (Multi-View+Depth) format.

BACKGROUND

MVD is a format used to transmit multi-view content (multiple views from multiple cameras) with associated depth maps for each view. When a multi-view video is represented in the MVD format, for each view picture a texture image is associated with a depth map, for example, at the same pixel resolution. The depth map may be generated by different methods, for example, through calculation or measurement. MVD is the input format used for an extension of HEVC (High Efficiency Video Coding) to compress multiple views and associated depth information. This format will probably be also the input format for a future extension of H.266/VVC (Versatile Video Coding) to address future 6DoF (six degrees of freedom) content such as those MPEG call today "windowed 6DoF".

SUMMARY

According to an embodiment, a method of video processing is provided, comprising: accessing a first view and a second view of multi-view video content; projecting a first pixel at a first position in said first view onto a second position in said second view; determining a difference between (1) texture information of said first pixel of said first view and (2) texture information of a second pixel at said second position in said second view; and responsive to said difference, adjusting a depth value of said second pixel of said second view based on a depth value of said first pixel of said first view.

According to another embodiment, an apparatus for video processing is provided, comprising one or more processors, wherein said one or more processors are configured to: access a first view and a second view of multi-view video content; project a first pixel at a first position in said first view onto a second position in said second view; determine a difference between (1) texture information of said first pixel of said first view and (2) texture information of a second pixel at said second position in said second view; and responsive to said difference, adjust a depth value of said second pixel of said second view based on a depth value of said first pixel of said first view. The apparatus may further comprise one or more memories coupled to said one or more processors.

According to another embodiment, an apparatus for video processing is provided, comprising: means for accessing a first view and a second view of multi-view video content; means for projecting a first pixel at a first position in said first view onto a second position in said second view; determining a difference between (1) texture information of said first pixel of said first view and (2) texture information of a second pixel at said second position in said second view; and responsive to said difference, means for adjusting a depth value of said second pixel of said second view based on a depth value of said first pixel of said first view.

DETAILED DESCRIPTION

Figure 1:
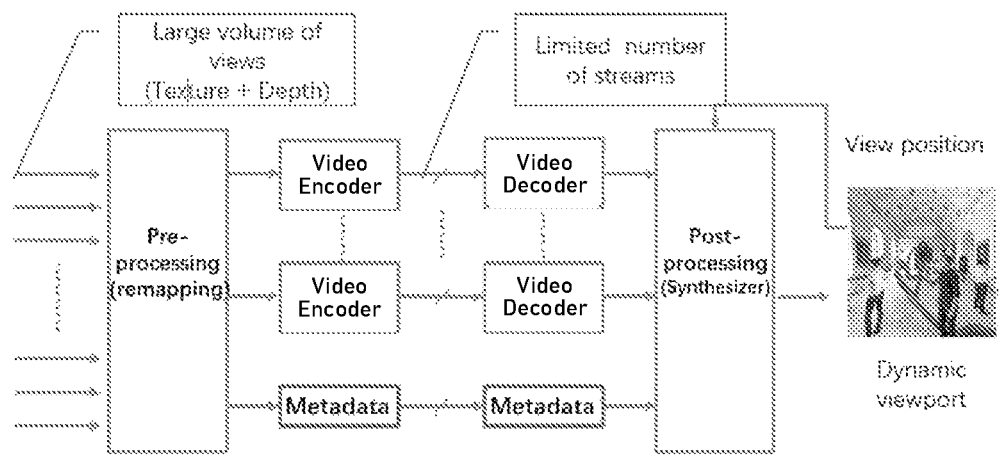
FIG. 1 illustrates a system for encoding and decoding multi-view video content.

To provide motion parallax, multi-view content should be dense enough to provide enough overlap between views but with different viewing angles to allow this parallax. It means that a lot of information captured by different cameras corresponds to the same part of the scene. This is one element a compression algorithm would exploit to reduce the amount of data to be transmitted. In 3D-HEVC and MV-HEVC extensions of HEVC, inter-view prediction was already introduced. At that time, multi-view systems were mostly considered as horizontal-only systems and prediction mechanisms exploit only the horizontal direction. Now camera arrays are no more horizontal only but more in a 2D (planar) or even 3D (non-planar) arrangement.

Depth estimation is one useful element in providing multi-view content. Since the use of the content may require synthesis of an intermediate view point, depth information is usually transmitted. In one example, the way to calculate depth information relies on matching criteria between the current view and adjacent views. In order to limit the amount of calculation, only nearest views (the ones that usually maximize the correlation) are used for such calculation. Usually, depth information associated with a view is calculated independently from the other views and thereby the depth maps from different views may lack coherency. The present embodiments are directed to methods to modify depth maps to provide more coherency between them. The coherency of two depth maps can be measured by the number of pixels of the corresponding views that are located at the same place in space (world coordinate system) when they are de-projected using the depth map information from the view to the world coordinate system.

MPEG-I program targets the delivery of 6DoF contents, which allows the end-user to perceive parallax. The rendered content at the client side should be adapted in real time to head movements of the observer. To create this parallax, one should deliver not only the usual 2D content but also content corresponding to what is not viewed from the initial view point but could be viewed from other view points. This content can be typically captured by a camera array, each camera seeing the scene from a slightly different angle. The distance between cameras gives roughly the amount of parallax the system will be able to provide.

The amount of data to transmit multi-view content is huge. It includes depth maps associated with each view to enable synthetizing other view points at the rendering side. The MVD format has already been used in the past to deliver such content. It was for instance already used as input format for the 3D-HEVC extension of HEVC.

If view synthesis is used to generate a view point the user may request, depth information is typically transmitted with the texture. Furthermore, depth maps from different views should be coherent in order to achieve correct view synthesis. In a multi-view acquisition system, a same point in the World Coordinate System (WCS) may be captured by several cameras and belongs to several views. Depth map estimation is applied to each view and it associates a depth information to each pixel. For two pixels of two views corresponding to the same point in the WCS, the associated depth should allow recreating the same point in the WCS when de-projection is applied. We have a coherency between depth maps of two views when a given number of pixels verifies this property. Otherwise, their projections in WCS will not be at the same location and then a projection onto a synthetized view point will create a double pixel effect. At the end such difference may strongly reduce the quality of view synthesis.

The reference software developed within MPEG called DERS (Depth Estimation Reference Software) is available to the whole MPEG community. It has been largely updated since the very first version and the DERS7.0 is now the latest reference version. Nevertheless, even latest developments still do not address the need for coherency between different depth maps. Each view uses a set of input views to estimate its own depth map. Since there is no correlation between two estimations corresponding to two different views, the estimated depth maps are usually not coherent. When depth maps from different views are used to generate a point cloud, there is no special processing to ensure that two depth estimations corresponding to the same point in space will be coherent. It may happen that the two depth maps will give two separated points in space. Further processing using these depths may fail since a same point in space is associated with more than one depth.

The present methods attempt to provide a more consistent set of depth maps for a set of views in order to have a more coherent point cloud associated with multi-view plus depth content. Although there may remain isolated pixels in the point cloud, the result is a more coherent point cloud in which there is a unique 3D point in space for a given point in the scene. Further processing such as view synthesis based on several views and associated depths can therefore be improved.

FIG. 1 illustrates a system for encoding and decoding multi-view video content. The multi-view video content represented in the MVD format is used as input. The depth maps may be processed in the pre-processing module to improve coherency. The multi-view content can then be encoded and decoded using video encoder(s)/decoder(s), for example, HEVC/VVC encoder(s)/decoder(s). Metadata, such as pose and intrinsic parameters for cameras used to capture the multi-view video content may also be transmitted. Because of the enhanced coherency in the depth maps, the encoding efficiency may be improved. At the decoder side, the depth maps may be processed to improve the coherency in the post-processing module. The multi-view video content may then be rendered and displayed to a viewer at dynamic view points. With enhanced coherency between views, view synthesis may be improved and therefore improve the viewing experience by the users.

Figure 2:
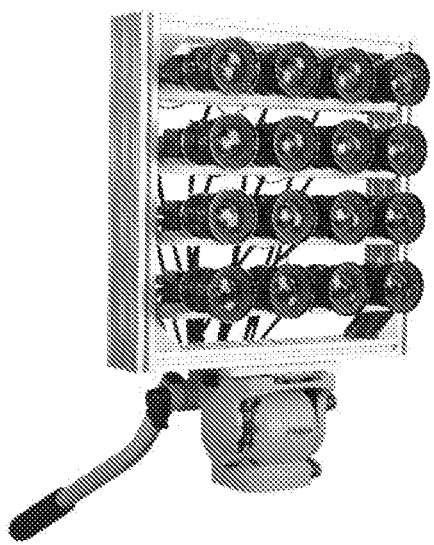
FIG. 2 illustrates a 16-camera array.
Figure 3:
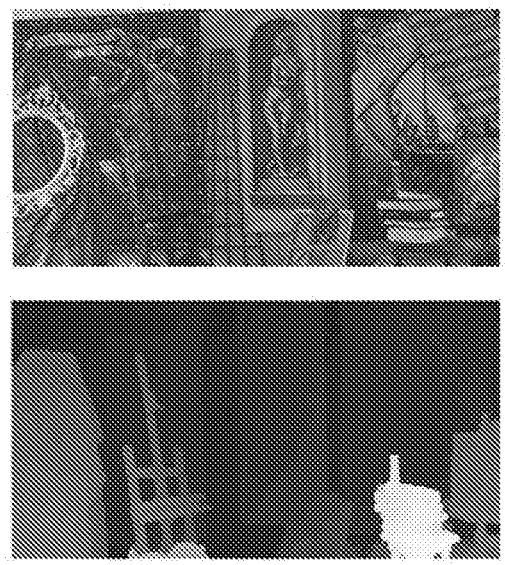
FIG. 3 illustrates a texture image and its associated depth from a view.

FIG. 2 illustrates an example of a 16-camera array (on 4 cameras by 4 cameras basis), and FIG. 3 illustrates an example of one view and its associated depth map. With such kind of camera array, overlap between captured views is important.

Figure 4:
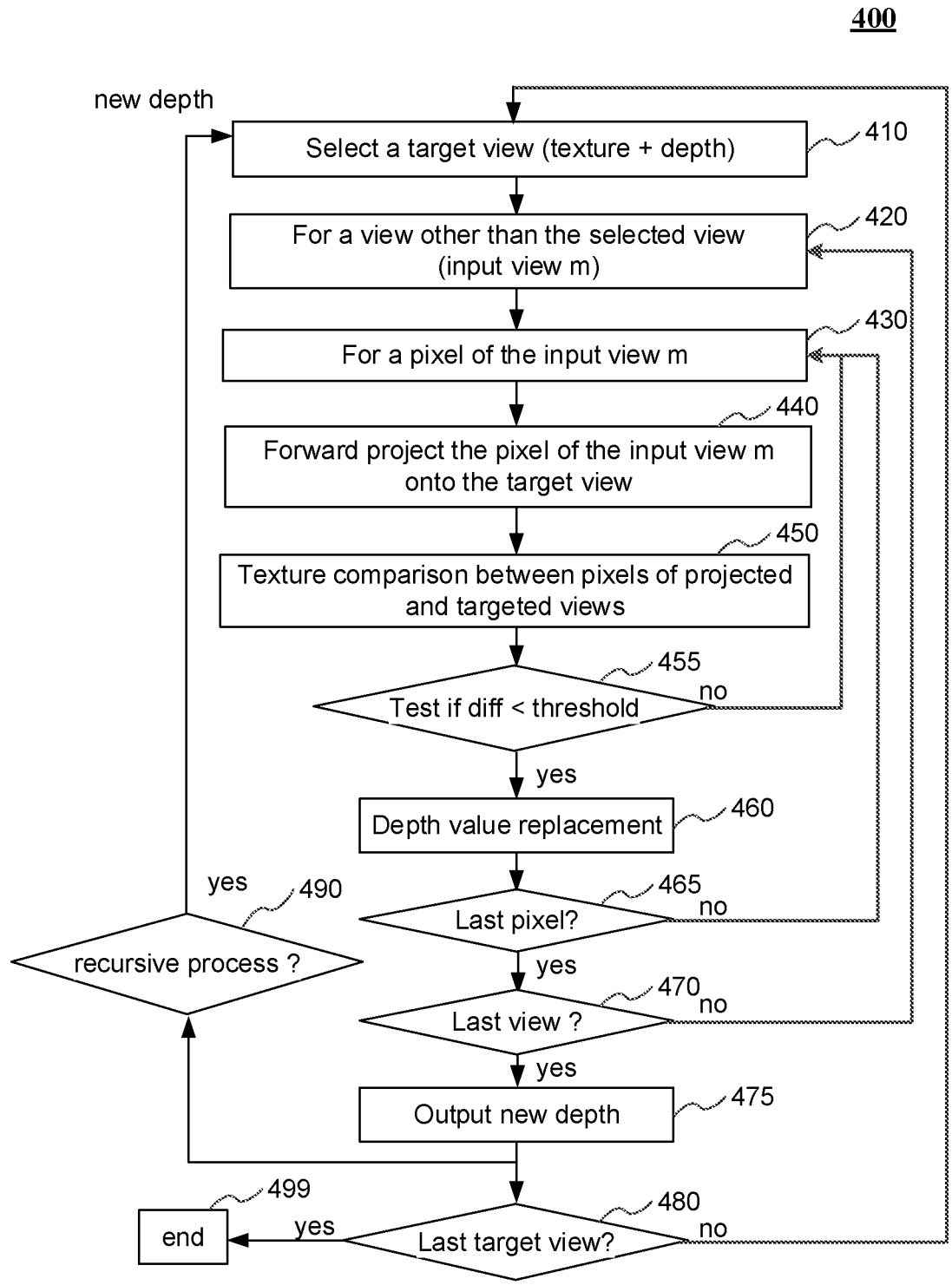
FIG. 4 illustrates a process to process depth maps, according to an embodiment.

FIG. 4 illustrates an example method 400 for processing depth maps, according to an embodiment. Method 400 can be used in pre-processing and post-processing modules, as shown in FIG. 1. For a multi-view video with multiple views, the process is applied to at least one view, and it can be applied to a group of input views or to all input views. In the following, for ease of notations, we refer to the view whose depth map is to be processed as a "target view," and the view resulted from the current input view being projected onto the target view as a "projected view."

In method 400, at step 410, the target view to be processed is selected. In one example, each input view will be processed, namely, each input view will be a target view at some point. At step 420, another input view other than the target view is selected. This selection is done among all the possible input views or among a set of input views defined relatively to the target view. We can for instance select only from the nearest views. At step 430, a pixel of the input view (m) is forward projected (440) onto the target view. At step 450, the photo-consistency between the pixels of the projected view and the pixels of the target view is assessed, for example, based on texture difference. At step 455, if the photo-consistency is above (455) a given threshold (i.e., the difference is below a given threshold), the process of depth replacement can be launched at step 460.

When no more pixels are to be processed (465, 470), the new depth map is available as output (475). In order to remove potential isolated wrong depth information, filtering, for example, a median filter can be applied. The process may be recursive (490), that is, at the end of processing the target view, the modified depth is considered as the new depth for processing another target view. Alternatively, the process is not recursive, that is, the new depth of a target view is not considered for processing another target view, rather the old depth is the one to be considered. After all target views are processed (480), method 400 ends at step 499.

In the following, methods that can be used for forward projection (440), measuring photo-consistency (450), and depth value replacement (460) are described in further detail.

Forward Projection

Let's consider a camera calibrated as a plain pinhole. Let $$K = \begin{pmatrix} f & \gamma & c_u \\ 0 & \alpha f & c_v \\ 0 & 0 & 1 \end{pmatrix}$$

be its intrinsic matrix, where f denotes the distance from the exit pupil to the sensor, expressed in pixels, and often referred to as "focal length";

$$\begin{pmatrix} c_u \\ c_v \end{pmatrix}$$

denotes the pixel coordinates of the so-called "principal point", i.e., the orthogonal projection of the pinhole onto the sensor; and a and y respectively denote pixels' aspect ratio and the sensor's skew coefficient.

If $$\begin{pmatrix} x \\ y \\ z \end{pmatrix}$$

are the coordinates of a given point in the Coordinate System (CS) of the camera, the coordinates of its image projection $$\begin{pmatrix} u \\ v \end{pmatrix}$$

are given (in pixel) by:

$$\begin{pmatrix} u \\ v \\ 1 \end{pmatrix} \equiv K \cdot \begin{pmatrix} x \\ y \\ z \end{pmatrix}$$

where the symbol "≡" denotes the equivalence relation between homogeneous vectors:

$$\begin{pmatrix} s \\ t \\ 1 \end{pmatrix} \equiv \begin{pmatrix} x \\ y \\ z \end{pmatrix} \Leftrightarrow \begin{cases} s = x/z \\ t = y/z \end{cases}$$

Now let $P=(R\ T)\in \mathbb{R}_{3\times 4}$ denote the pose matrix of the camera, where $R\in \mathbb{R}_{3\times 3}$ and $T\in \mathbb{R}_{3\times 1}$ respectively denote the camera's orientation and position in a reference Coordinate System (CS). The camera's extrinsic matrix is defined by:

$$Q=(R^{-1}\ -R^{-1}\cdot T)\in \mathbb{R}_{3\times 4}$$

Figure 5:
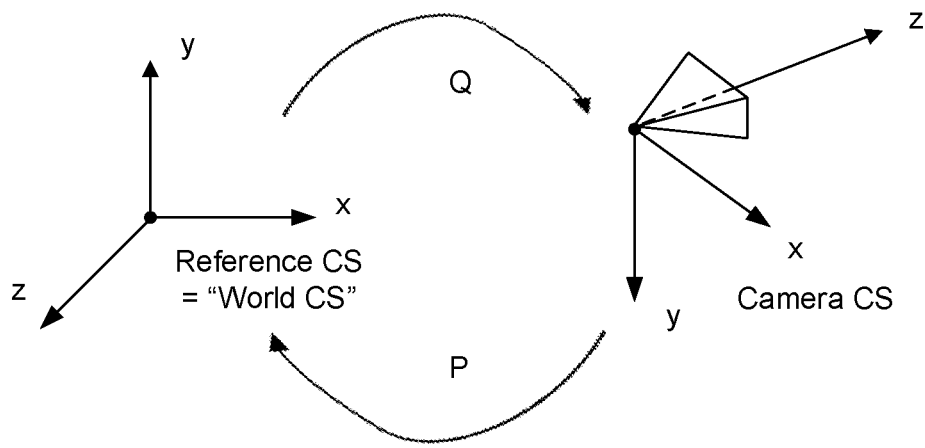
FIG. 5 illustrates the world and camera coordinate systems and corresponding transition matrices.

If $$X_{cam} = \begin{pmatrix} x_{cam} \\ y_{cam} \\ z_{cam} \end{pmatrix} \text{ and } X_{world} = \begin{pmatrix} x_{world} \\ y_{world} \\ z_{world} \end{pmatrix}$$

denote the coordinates of the same point respectively in the Camera CS and in the reference CS, then $$X_{cam} = Q \cdot \begin{pmatrix} X_{world} \\ 1 \end{pmatrix} \text{ and } X_{world} = P \cdot \begin{pmatrix} X_{cam} \\ 1 \end{pmatrix},$$

as illustrated in FIG. 5 that shows the world and camera Coordinate Systems and corresponding transition matrices.

Figure 6:
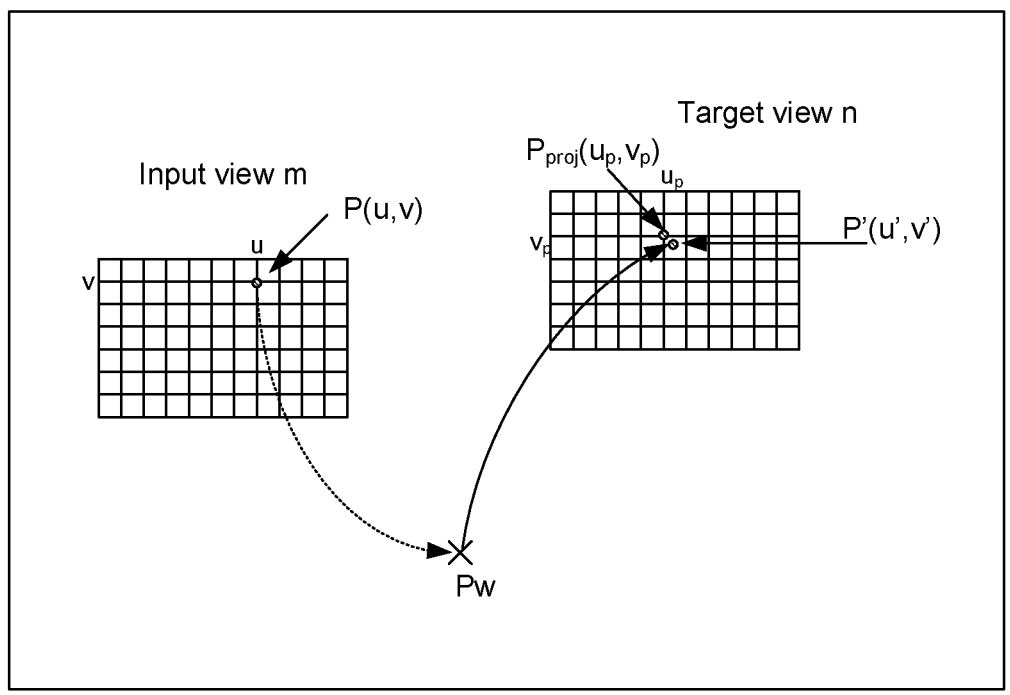
FIG. 6 illustrates forward projection of an input view onto a target view.

Now let's consider a given camera as corresponding to the input view and let m be its index. Let $$\begin{pmatrix} u \\ v \end{pmatrix}$$

be the position of the current pixel in the texture image of the input view, and z be its presumed depth. The forward projection of one input view m onto a target view n can be performed, for a pixel P(u,v) of the input view m (from camera m), as illustrated in FIG. 6.

At first, the pixel of the input view m is de-projected into the World Coordinate System (XYZ) as Pw. This de-projection uses the pose matrix, the inverse intrinsic matrix of the camera m and the depth Z(u,v) associated with this pixel. Subsequently, the pixel Pw is projected onto the target view n to get P'(u',v'). The point in space Pw is projected onto the target view n using the intrinsic matrix and the extrinsic matrix of the camera n.

Mathematically, the global calculation to get P'(u',v') from P(u,v) can be expressed as:

$$\begin{pmatrix} u' \\ v' \\ 1 \end{pmatrix} \equiv K_n \cdot Q_n \cdot \left( P_m \cdot \begin{pmatrix} z \cdot K_m^{-1} \cdot \begin{pmatrix} u \\ v \\ 1 \end{pmatrix} \\ 1 \end{pmatrix} \right) \quad \text{equation (1)}$$

When the projection does not fall into the view n area, the projection can be rejected. The rejections may cause holes for some of the pixel in the projected view and there will be no texture comparison for these pixels. When the projection falls into the camera n area, the projection most probably does not fall onto a real pixel but in between 4 pixels. If the pixel is not rejected, the nearest pixel on the camera n can be selected, as $P_{proj}(u_p,v_p)$. The nearest pixel is the one that minimizes the distance between the result of the projection P'(u',v') and one of the 4 neighbor pixels, where the distance can be calculated as the square root of the sum of square difference between coordinates:

P1 (int(u'), int(v'))
P2 (int(u')+1, int(v'))
P3 (int(u'), int(v')+1)
P4 (int(u')+1, int(v')+1)

Photo-Consistency

In order to decide whether or not to consider depth information from another view for the target view, the photo-consistency of the projected pixel is evaluated, for example, through a weighted difference between target and projected texture. The photo-consistency is high when the difference is low. In one embodiment, the difference can be based on comparison using the absolute difference between texture of the current pixel of both target view (Rt, Gt, Bt) and projected view (Rp, Gp, Bp). The comparison is applied to the three components of the texture (R, G, B), and the comparison can be applied using different weights for each component or using same weights.

Difference=$wr$*abs($Rt-Rp$)+$wg$*abs($Gt-Gp$)+$wb$*abs($Bt-Bp$)

The weights wr, wg and wb can be all equal to ⅓ or can have different values in order for instance to better represent their contributions to the luminance.

In another embodiment, the comparison is based on the square difference between texture of the current pixel of both target view and projected view. The comparison is applied to the three components of the texture (R, G, B), and the comparison can be applied using different weights for each component or using same weights.

Difference=$wr$*$(Rt-Rp)^2$+$wg$*$(Gt-Gp)^2$+$wb$*$(Bt-Bp)^2$

The weights wr, wg and wb can be all equal to ⅓ or can have different values in order for instance to better represent their contributions to the luminance.

In another embodiment, the comparison is based on the square difference or absolute difference between texture of a group of pixels around the current pixel of both the target view and projected view. The comparison is applied to the three components of the texture (R, G, B), and the comparison can be applied using different weights for each component or using same weights. The size of the window can be 3*3 or 5*5 pixels or any other values.

$$\text{Difference} = \Sigma\Sigma(wr^*(Rt-Rp)^2 + wg^*(Gt-Gp)^2 + wb^*(Bt-Bp)^2)$$

Depth Value Replacement

If texture comparison shows that the pixel from the projected view is similar to the pixel of the target view (e.g., the texture difference is below a given threshold and the photo-consistency is high), then it is possible to replace the depth value of the target view by a depth value related to the projected view. It can be done, for example, using one of the following approaches.

The first solution is to simply replace the depth value of the target view by the depth value of the projected view. Using FIG. 6 as the example, the depth value at $P_{proj}(u_p, v_p)$ in target view n is replaced by the depth value at $P(u,v)$ in input view m. This first solution assumes that the cameras are coplanar with parallel optical axes. Related to equation (1) it means the following relationship between pose matrix of the input view m and the extrinsic matrix of the target view n:

$$Q_n \cdot \begin{pmatrix} & P_m & \\ 0 & 0 & 0 & 1 \end{pmatrix} = \begin{pmatrix} \cos\theta & -\sin\theta & 0 & b_x \\ \sin\theta & \cos\theta & 0 & b_y \\ 0 & 0 & 1 & 0 \end{pmatrix}$$

where θ represents the angle of rotation around the z axe. As a consequence, we have z'=z.

The second solution is to replace the depth value of the target view by a recalculated depth value of the projected view. This recalculation integrates the pose and the intrinsic camera parameter of the target view. The new z' value is calculated using equation (1).

The third solution is to check if the depth value of the target view satisfies for the projected view the criteria tested for the projected view. In particular, the depth of the target view is used to implement the inverse processing, by projecting the target view onto the input view and testing if the photo-consistency is above a threshold (this threshold can be the same or another). If the inverse processing is successful, the replacement is not done, otherwise it is done as described before.

After the target view has been processed (i.e., a new depth map is available), the result may be filtered since isolated depth data may have been introduced during the process. To eliminate such isolated depth data, a median filter can be applied. The size of the median filter is to be defined, as well as the number of median filtering applied. The size can be 3*3 pixels or 5*5 or larger. The number of occurrences of the median filter can be one or more than one. Typical values are a 5*5 window and 2 occurrences. Different variants of the median filter are possible depending on the size of the window and the number of occurrences. Other filters such as averaging filters may also be used.

Various methods are described herein, and each of the methods comprises one or more steps or actions for achieving the described method. Unless a specific order of steps or actions is required for proper operation of the method, the order and/or use of specific steps and/or actions may be modified or combined.

In the above, HEVC or VVC is used when describing video encoders/decoders. It should be noted that, the present aspects are not limited to VVC or HEVC, and can be applied, for example, when other standards and recommendations, and extensions of any such standards and recommendations are used. The color space of the texture video is not limited to the RGB space, and for example, can be represented in YUV. Unless indicated otherwise, or technically precluded, the aspects described in this application can be used individually or in combination.

Various numeric values are used in the present application, for example, the size of the median filter. The specific values are for purposes of examples and the aspects described are not limited to these specific values.

Figure 7:
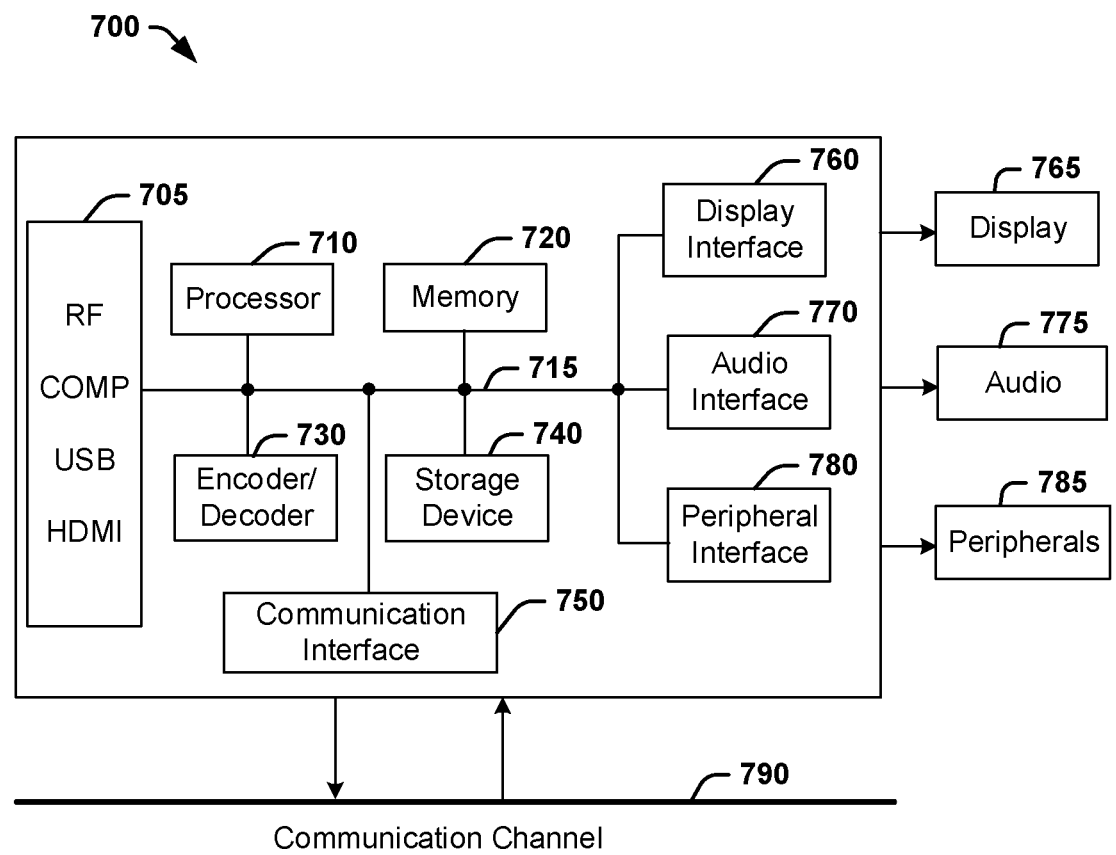
FIG. 7 illustrates a block diagram of a system within which aspects of the present embodiments may be implemented.

FIG. 7 illustrates a block diagram of an example of a system in which various aspects and embodiments are implemented. System 700 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 700, singly or in combination, may be embodied in a single integrated circuit, multiple ICs, and/or discrete components. For example, in at least one embodiment, the processing and encoder/decoder elements of system 700 are distributed across multiple ICs and/or discrete components. In various embodiments, the system 700 is communicatively coupled to other systems, or to other electronic devices, via, for example, a communications bus or through dedicated input and/or output ports. In various embodiments, the system 700 is configured to implement one or more of the aspects described in this application.

The system 700 includes at least one processor 710 configured to execute instructions loaded therein for implementing, for example, the various aspects described in this application. Processor 710 may include embedded memory, input output interface, and various other circuitries as known in the art. The system 700 includes at least one memory 720 (e.g., a volatile memory device, and/or a non-volatile memory device). System 700 includes a storage device 740, which may include non-volatile memory and/or volatile memory, including, but not limited to, EEPROM, ROM, PROM, RAM, DRAM, SRAM, flash, magnetic disk drive, and/or optical disk drive. The storage device 740 may include an internal storage device, an attached storage device, and/or a network accessible storage device, as non-limiting examples.

System 700 includes an encoder/decoder module 730 configured, for example, to process data to provide an encoded video or decoded video, and the encoder/decoder module 730 may include its own processor and memory. The encoder/decoder module 730 represents module(s) that may be included in a device to perform the encoding and/or decoding functions. As is known, a device may include one or both of the encoding and decoding modules. Additionally, encoder/decoder module 730 may be implemented as a separate element of system 700 or may be incorporated within processor 710 as a combination of hardware and software as known to those skilled in the art.

Program code to be loaded onto processor 710 or encoder/decoder 730 to perform the various aspects described in this application may be stored in storage device 740 and subsequently loaded onto memory 720 for execution by processor 710. In accordance with various embodiments, one or more of processor 710, memory 720, storage device 740, and encoder/decoder module 730 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 710 and/or the encoder/decoder module 730 is used to store instructions and to provide working memory for processing that is needed during encoding or decoding. In other embodiments, however, a memory external to the processing device (for example, the processing device may be either the processor 710 or the encoder/decoder module 730) is used for one or more of these functions. The external memory may be the memory 720 and/or the storage device 740, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 700 may be provided through various input devices as indicated in block 705. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 705 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 700 to other electronic devices across USB and/or HDMI connections. It is to be understood that various aspects of input processing, for example, Reed-Solomon error correction, may be implemented, for example, within a separate input processing IC or within processor 710 as necessary. Similarly, aspects of USB or HDMI interface processing may be implemented within separate interface ICs or within processor 710 as necessary. The demodulated, error corrected, and demultiplexed stream is provided to various processing elements, including, for example, processor 710, and encoder/decoder 730 operating in combination with the memory and storage elements to process the datastream as necessary for presentation on an output device.

Various elements of system 700 may be provided within an integrated housing, Within the integrated housing, the various elements may be interconnected and transmit data therebetween using suitable connection arrangement 715, for example, an internal bus as known in the art, including the I2C bus, wiring, and printed circuit boards.

The system 700 includes communication interface 750 that enables communication with other devices via communication channel 790. The communication interface 750 may include, but is not limited to, a transceiver configured to transmit and to receive data over communication channel 790. The communication interface 750 may include, but is not limited to, a modem or network card and the communication channel 790 may be implemented, for example, within a wired and/or a wireless medium.

Data is streamed to the system 700, in various embodiments, using a Wi-Fi network such as IEEE 802.11. The Wi-Fi signal of these embodiments is received over the communications channel 790 and the communications interface 750 which are adapted for Wi-Fi communications. The communications channel 790 of these embodiments is typically connected to an access point or router that provides access to outside networks including the Internet for allowing streaming applications and other over-the-top communications. Other embodiments provide streamed data to the system 700 using a set-top box that delivers the data over the HDMI connection of the input block 705. Still other embodiments provide streamed data to the system 700 using the RF connection of the input block 705.

The system 700 may provide an output signal to various output devices, including a display 765, speakers 775, and other peripheral devices 785. The other peripheral devices 785 include, in various examples of embodiments, one or more of a stand-alone DVR, a disk player, a stereo system, a lighting system, and other devices that provide a function based on the output of the system 700. In various embodiments, control signals are communicated between the system 700 and the display 765, speakers 775, or other peripheral devices 785 using signaling such as AV.Link, CEC, or other communications protocols that enable device-to-device control with or without user intervention. The output devices may be communicatively coupled to system 700 via dedicated connections through respective interfaces 760, 770, and 780. Alternatively, the output devices may be connected to system 700 using the communications channel 790 via the communications interface 750. The display 765 and speakers 775 may be integrated in a single unit with the other components of system 700 in an electronic device, for example, a television. In various embodiments, the display interface 760 includes a display driver, for example, a timing controller (T Con) chip.

The display 765 and speaker 775 may alternatively be separate from one or more of the other components, for example, if the RF portion of input 705 is part of a separate set-top box. In various embodiments in which the display 765 and speakers 775 are external components, the output signal may be provided via dedicated output connections, including, for example, HDMI ports, USB ports, or COMP outputs.

According to an embodiment, a method of video processing is provided, comprising: accessing a first view and a second view of multi-view video content; projecting a first pixel at a first position in said first view onto a second position in said second view; determining a difference between (1) texture information of said first pixel of said first view and (2) texture information of a second pixel at said second position in said second view; and responsive to said difference, adjusting a depth value of said second pixel of said second view based on a depth value of said first pixel of said first view.

According to another embodiment, an apparatus for video processing is provided, comprising one or more processors, wherein said one or more processors are configured to: access a first view and a second view of multi-view video content; project a first pixel at a first position in said first view onto a second position in said second view; determine a difference between (1) texture information of said first pixel of said first view and (2) texture information of a second pixel at said second position in said second view; and responsive to said difference, adjust a depth value of said second pixel of said second view based on a depth value of said first pixel of said first view. The apparatus may further comprise one or more memories coupled to said one or more processors.

According to another embodiment, an apparatus for video processing is provided, comprising: means for accessing a first view and a second view of multi-view video content; means for projecting a first pixel at a first position in said first view onto a second position in said second view; determining a difference between (1) texture information of said first pixel of said first view and (2) texture information of a second pixel at said second position in said second view; and responsive to said difference, means for adjusting a depth value of said second pixel of said second view based on a depth value of said first pixel of said first view.

In one embodiment, said projection comprises: projecting said first pixel into a fourth position in a world coordinate system, based on pose and inverse intrinsic parameters associated with a camera used to capture said first view; projecting said fourth position in said world coordinate system into a fifth position in said second view based on intrinsic and extrinsic parameters associated with a camera used to capture said second view; and obtaining said second position from said fifth position. In one embodiment, said obtaining comprises selecting a nearest pixel position of said fifth position as said second position.

In one embodiment, said multi-view video content is represented in a Multi-view plus Depth (MVD) format.

In one embodiment, said first view is a neighbor view of said second view.

In one embodiment, said difference is determined based on respective differences of three components of (1) said texture information of said first pixel of said first view and (2) said texture information of said second pixel of said second view. In another embodiment, said difference is determined based on respective differences of three components of (1) texture information of a group of pixels around said first pixel of said first view and (2) texture information of a corresponding group of pixels around said second pixel of said second view.

In one embodiment, said adjustment is performed if said difference is smaller than a value.

In one embodiment, said adjusting further comprising applying pose and intrinsic parameters associated with said second view.

In one embodiment, said one or more processors are further configured to perform: projecting said second pixel of said second view onto a third position in said first view; determining a second difference between (1) said texture information of said second pixel of said second view and (2) texture information of a third pixel at said third position in said first view, wherein said adjustment is performed only if said second difference is smaller than a second value.

In one embodiment, said projection is performed for all pixels in said first view. Said projection result may be filtered, for example, by a median filter. Said project result may form a projected view.

In one embodiment, said first view is represented by a first texture image and a first depth map, and said second view is represented by a second texture image and a second depth map.

An embodiment provides a computer program comprising instructions which when executed by one or more processors cause the one or more processors to perform the video processing method according to any of the embodiments described above. One or more of the present embodiments also provide a computer readable storage medium having stored thereon instructions for processing depth data according to the methods described above.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of video processing, comprising:
  accessing a first view and a second view of multi-view video content;
  projecting a first pixel at a first position in the first view onto a second position in the second view;
  determining a difference between texture information of the first pixel of the first view and texture information of a second pixel at the second position in the second view by evaluating photo-consistency between the first pixel of the first view and the second pixel of the second view; and
  adjusting a depth value of the second pixel of the second view based on a depth value of the first pixel of the first view, based on a comparison of the difference with a threshold value.

2. The method of claim 1, wherein the projecting comprises:
  projecting the first pixel into a fourth position in a world coordinate system, based on pose and inverse intrinsic parameters associated with a camera used to capture the first view;
  projecting the fourth position in the world coordinate system into a fifth position in the second view based on intrinsic and extrinsic parameters associated with a camera used to capture the second view; and
  obtaining the second position from the fifth position.

3. The method of claim 2, wherein the obtaining comprises selecting a nearest pixel position of the fifth position as the second position.

4. The method of claim 1, wherein the first view is a neighbor view of the second view.

5. The method of claim 1, wherein the difference is determined based on respective differences of three components of the texture information of the first pixel of the first view and the texture information of the second pixel of the second view.

6. The method of claim 1, wherein the difference is determined based on respective differences of three components of texture information of a group of pixels around the first pixel of the first view and texture information of a corresponding group of pixels around the second pixel of the second view.

7. The method of claim 1, wherein the adjusting is performed if the difference is smaller than the threshold value.

8. The method of claim 1, wherein the adjusting further comprises applying pose and intrinsic parameters associated with the second view.

9. The method of claim 1, further comprising:
  projecting the second pixel of the second view onto a third position in the first view; and
  determining a second difference between the texture information of the second pixel of the second view and texture information of a third pixel at the third position in the first view, wherein the adjustment is performed only if the second difference is smaller than a second value.

10. The method of claim 1, wherein the projecting is performed for all pixels in the first view.

11. The method of claim 10, wherein the projection result is filtered.

12. The method of claim 1, wherein the first view is represented by a first texture image and a first depth map, and wherein the second view is represented by a second texture image and a second depth map.

13. The method of claim 1, wherein the multi-view video content is represented in a Multi-view plus Depth (MVD) format.

14. An apparatus for video processing, comprising one or more processors, wherein the one or more processors are configured to:
  access a first view and a second view of multi-view video content;
  project a first pixel at a first position in the first view onto a second position in the second view;
  determine a difference between texture information of the first pixel of the first view and texture information of a second pixel at the second position in the second view by evaluating photo-consistency between the first pixel of the first view and the second pixel of the second view; and adjust a depth value of the second pixel of the second view based on a depth value of the first pixel of the first view, based on a comparison of the difference with a threshold value.

15. The apparatus of claim 14, wherein the one or more processors are configured to:

project the first pixel into a fourth position in a world coordinate system, based on pose and inverse intrinsic parameters associated with a camera used to capture the first view;

project the fourth position in the world coordinate system into a fifth position in the second view based on intrinsic and extrinsic parameters associated with a camera used to capture the second view; and obtain the second position from the fifth position.

16. The apparatus of claim 15, wherein the one or more processors are configured to select a nearest pixel position of the fifth position as the second position.

17. The apparatus of claim 14, wherein the first view is a neighbor view of the second view.

18. The apparatus of claim 14, wherein the difference is determined based on respective differences of three components of the texture information of the first pixel of the first view and the texture information of the second pixel of the second view.

19. The apparatus of claim 14, wherein the difference is determined based on respective differences of three components of texture information of a group of pixels around the first pixel of the first view and texture information of a corresponding group of pixels around the second pixel of the second view.

20. The apparatus of claim 14, wherein the adjustment is performed if the difference is smaller than the threshold value.

21. The apparatus of claim 14, wherein the adjustment further comprises applying pose and intrinsic parameters associated with the second view.

22. The apparatus of claim 14, wherein the one or more processors are further configured to:

project the second pixel of the second view onto a third position in the first view; and determine a second difference between the texture information of the second pixel of the second view and texture information of a third pixel at the third position in the first view, wherein the adjustment is performed only if the second difference is smaller than a second threshold value.

23. The apparatus of claim 14, wherein the projection is performed for all pixels in the first view.

24. The apparatus of claim 23, wherein the projection result is filtered.

25. The apparatus of claim 14, wherein the first view is represented by a first texture image and a first depth map, and wherein the second view is represented by a second texture image and a second depth map.

26. The apparatus of claim 14, wherein the multi-view video content is represented in a Multi-view plus Depth (MVD) format.

27. A non-transitory machine readable medium having stored thereon machine executable instructions that, when executed, implement a method, the method comprising:

accessing a first view and a second view of multi-view video content;

projecting a first pixel at a first position in the first view onto a second position in the second view;

determining a difference between texture information of the first pixel of the first view and texture information of a second pixel at the second position in the second view by evaluating photo-consistency between the first pixel of the first view and the second pixel of the second view; and adjusting a depth value of the second pixel of the second view based on a depth value of the first pixel of the first view, based on a comparison of the difference with a threshold value.

* * * * *